(12) United States Patent
Kimura et al.

(10) Patent No.: US 7,553,576 B2
(45) Date of Patent: *Jun. 30, 2009

(54) SEPARATOR FOR FUEL CELL

(75) Inventors: Mikihiko Kimura, Sayama (JP); Shinya Kawachi, Sayama (JP); Keisuke Andou, Wako (JP); Tadashi Nishiyama, Wako (JP); Daisuke Okonogi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 422 days.

This patent is subject to a terminal disclaimer.

(21) Appl. No.: 10/511,220

(22) PCT Filed: Apr. 22, 2003

(86) PCT No.: PCT/JP03/05095

§ 371 (c)(1),
(2), (4) Date: Nov. 3, 2004

(87) PCT Pub. No.: WO03/092104

PCT Pub. Date: Nov. 6, 2003

(65) Prior Publication Data

US 2005/0142414 A1    Jun. 30, 2005

(30) Foreign Application Priority Data

Apr. 26, 2002  (JP) .............................. 2002-127385

(51) Int. Cl.
    *H01M 8/02* (2006.01)

(52) U.S. Cl. ............................ 429/35; 429/38; 429/39
(58) Field of Classification Search .................... None
    See application file for complete search history.

(56) References Cited

U.S. PATENT DOCUMENTS

| 2002/0004158 | A1 | 1/2002 | Suzuki et al. | |
| 2002/0122970 | A1* | 9/2002 | Inoue et al. | .................... 429/35 |
| 2003/0143451 | A1* | 7/2003 | Andou et al. | .................. 429/34 |

FOREIGN PATENT DOCUMENTS

| EP | 0 914 922 A1 | 5/1999 |
| JP | 09-283157 | * 10/1997 |
| JP | 10-255824 | 9/1998 |
| JP | 11-129396 | 5/1999 |
| JP | 2002-050368 | 2/2002 |
| JP | 2002-075396 | 3/2002 |

\* cited by examiner

*Primary Examiner*—Jonathan Crepeau
(74) *Attorney, Agent, or Firm*—Rankin, Hill & Clark LLP (57) ABSTRACT

A fuel cell separator is provided which has in a peripheral part (30) gas passages (31, 31) for guiding reaction gases and reaction product passages (33) for guiding a reaction product. The separator (20) is made up of a central part (22) made of metal, a peripheral part (30) made of a resin material, and an elastic member (40) connecting the central part and the peripheral part together. As a result of the peripheral part being made of a resin material, the gas passages and product passages are resistant to corrosion.

5 Claims, 11 Drawing Sheets

SEPARATOR FOR FUEL CELL

TECHNICAL FIELD

This invention relates to a fuel cell separator having multiple passages provided in a peripheral part of the separator and used to guide reaction gases and a reaction product.

BACKGROUND ART

Figure 10:
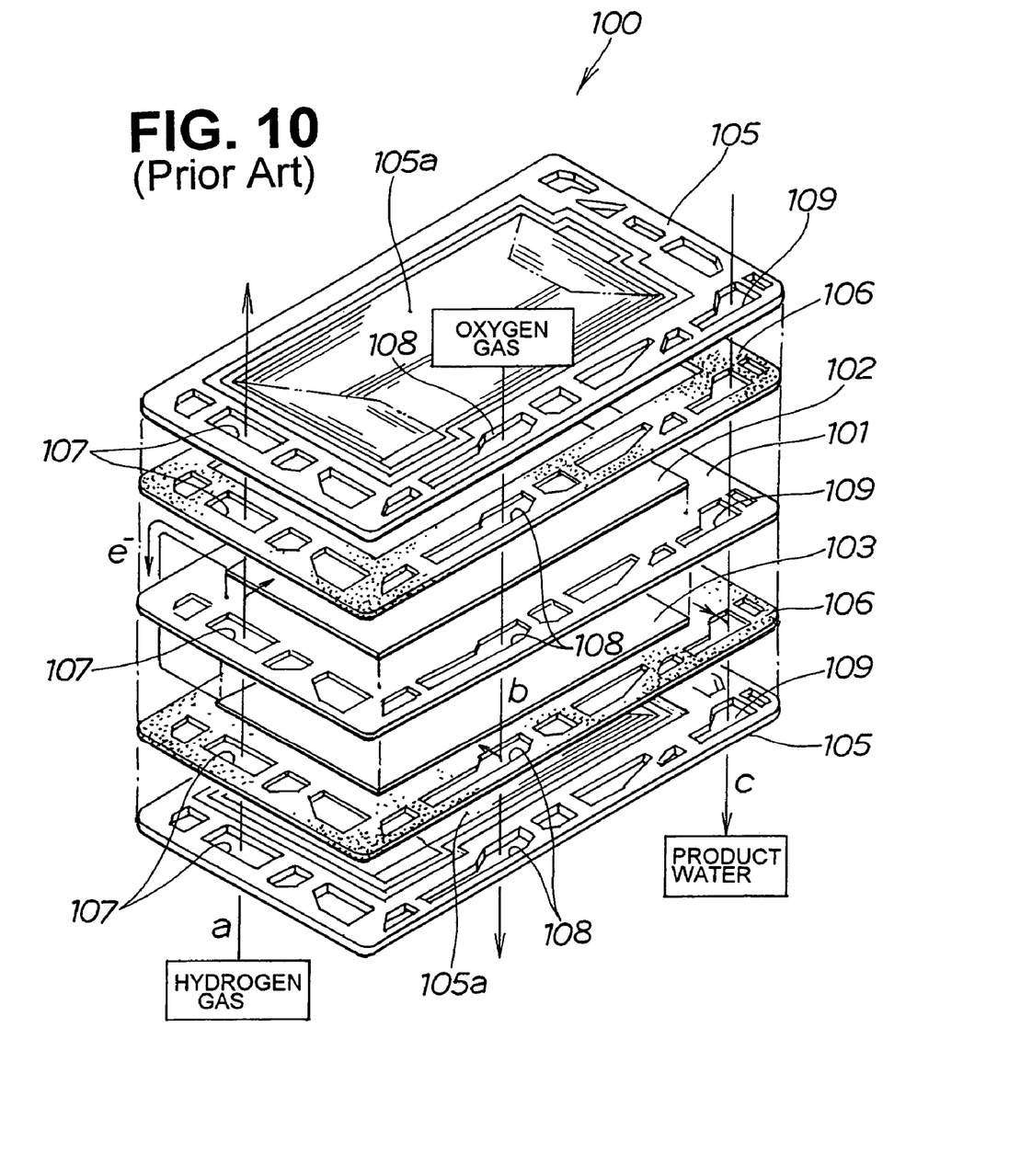
FIG. 10 is an exploded perspective view of a fuel cell of related art.

FIG. 10 shows a fuel cell of related art. This fuel cell 100 is made by disposing a negative electrode 102 and a positive electrode 103 respectively on the upper face side and the lower face side of an electrolyte membrane 101, placing a separator 105 on the upper side of the negative electrode 102 and sandwiching the peripheral vicinity of the electrolyte membrane 101 and the peripheral vicinity of the upper side separator 105 with an upper side gasket 106, and placing a separator 105 on the lower side of the positive electrode 103 and sandwiching the peripheral vicinity of the electrolyte membrane 101 and the peripheral vicinity of the lower side separator 105 with a lower side gasket 106.

With this fuel cell 100, hydrogen gas is supplied through multiple hydrogen gas passages 107 as shown by the arrow a. The hydrogen gas in the hydrogen gas passages 107 is guided toward a central part 105a of the upper side separator 105 as shown with an arrow. Oxygen gas is supplied through multiple oxygen gas passages 108 as shown by the arrow b. The oxygen gas in the oxygen gas passages 108 is guided toward the central part 105a of the lower side separator 105 as shown with an arrow.

As a result of hydrogen gas being introduced into the upper side central part 105a, hydrogen molecules ($H_2$) come into contact with a catalyst included in the negative electrode 102, and as a result of oxygen gas being introduced into the lower side central part 105a, oxygen molecules ($O_2$) come into contact with a catalyst included in the positive electrode 103, and electrons $e^-$ flow as shown with an arrow and a current is produced.

At this time, product water ($H_2O$) is produced from the hydrogen molecules ($H_2$) and the oxygen molecules ($O_2$), and this product water flows through multiple product water passages 109 as shown by the arrow c.

In this fuel cell 100, to maintain resistance to corrosion of the gas passages 107, 108 and the product water passages 109, it is necessary for the gas passages 107, 108 and the product water passages 109 to be sealed. To achieve this, in the manufacture of the fuel cell 100, the upper side gasket 106 is sandwiched in the gap between the peripheral vicinity of the electrolyte membrane 101 and the peripheral vicinity of the upper side separator 105, and the lower side gasket 106 is sandwiched in the gap between the peripheral vicinity of the electrolyte membrane 101 and the peripheral vicinity of the lower side separator 105.

Here, it is desirable for the fuel cell 100 to be compact, and it is necessary for the upper and lower gaskets 106 to be made thin. Consequently, handling of the upper and lower gaskets 106 has been difficult, it has taken time for the upper and lower gaskets 106 to be disposed in the proper positions, and this has constituted a hindrance to raising fuel cell productivity.

As a method of resolving this problem, for example the 'Manufacturing Method of a Silicone Resin—Metal Composite Body' of JP-A-11-309746 has been proposed. According to this method, gaskets can be eliminated by forming a silicone resin (hereinafter, 'seal') around the peripheral part of the separator. An injection-molding mold for manufacturing a fuel cell separator of related art is shown in FIG. 11, and a separator manufacturing method of related art will now be described.

Figure 11:
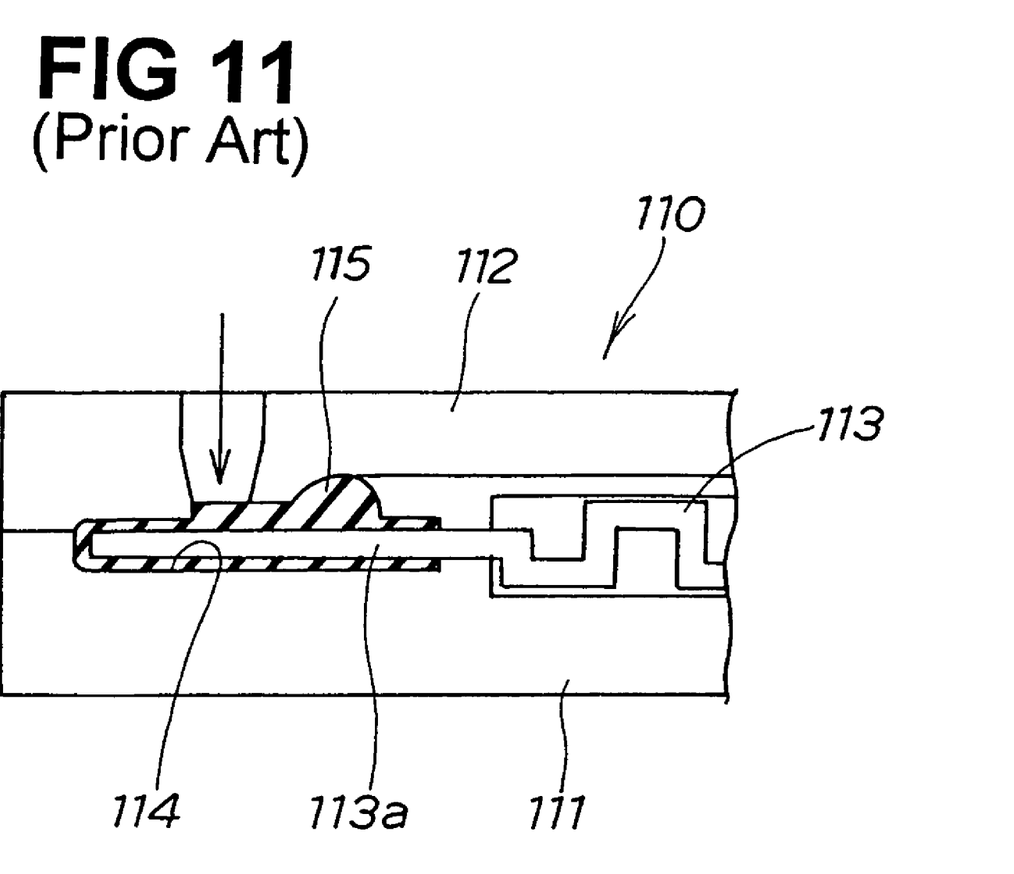
FIG. 11 is a sectional view showing a manufacturing method of a fuel cell separator of related art wherein a seal is molded to a peripheral part of a separator in an injection-molding mold.

Referring to FIG. 11, by an injection-molding mold 110 being closed, a separator 113 is inserted in a gap between a fixed die 111 and a moving die 112 and a cavity 114 is formed by the fixed die 111 and the moving die 112, and by the cavity 114 being filled with molten resin as shown with an arrow, a seal 115 is formed on a peripheral part 113a of the separator 113.

By the seal 115 being formed around the peripheral part 113a of the separator 113 like this, the upper and lower gaskets 106 shown in FIG. 10 can be made unnecessary. Therefore, in the manufacture of the fuel cell, it is possible to dispense with a step of incorporating the upper and lower gaskets 106.

To prevent the gas passages and product water passages of the separator 113 from being corroded by the gases and product water, it is necessary for the entire surfaces of the gas passages and the product water passages to be covered. Because of this, it is necessary not only for the upper face and the lower face of the peripheral part 113a of the separator 113 to be covered by the seal 115, but also for the wall faces of the gas passages and product water passages in the peripheral part 113a to be covered by the seal 115.

To cover the entire surfaces of the gas passages and product water passages of the peripheral part 113a with the seal 115 to raise their resistance to corrosion like this, it is necessary to raise the precision of equipment such as the injection-molding mold 110, equipment costs consequently rise, and this constitutes a hindrance to keeping costs down.

And even if the precision of the equipment is raised, it is difficult to cover the entire surfaces of the gas passages and product water passages of the peripheral part 113a with the seal 115, and yield in the manufacture of the separators is likely to fall, and this has constituted a hindrance to raising fuel cell productivity. Thus, a fuel cell separator has been awaited with which it is possible to secure corrosion resistance of the separator and also raise productivity as well as keeping costs down.

DISCLOSURE OF THE INVENTION

The invention provides, in a fuel cell separator having provided in a peripheral part gas passages for guiding reaction gases and reaction product passages for guiding a reaction product, reaction gases being guided from the gas passages to a central part and reaction product produced at the central part being guided to the reaction product passage, a fuel cell separator characterized in that the central part is made a metal member and the peripheral part is made a resin member and this resin member is connected to the metal member by an elastic member.

By making the entire peripheral part of the separator a resin member and forming gas passages and product water passages in this peripheral part like this, it is possible to secure resistance of the gas passages and product water passages to corrosion by the gases and product water.

And, a construction is adopted wherein the peripheral part of the separator is made a resin member and the peripheral part is connected to the central part by an elastic member. As a result of this, it is not necessary for the wall faces of the gas passages and the product water passages of the separator to be covered with a sealing material as in related art, and the peripheral part and the elastic member can be molded with a mold of ordinary precision. Consequently, because it is not necessary to use a high-precision mold, costs of equipment such as molds can be kept down.

Also, by the peripheral part of the separator being connected to the central part by an elastic member, the separator can be manufactured relatively easily. Therefore, the yield in the production of separators can be raised.

Here, because the resin member has a different thermal expansion coefficient from the metal member, if the resin member constituting the peripheral part were to be connected to the metal member constituting the central part directly, there would be a risk of the central part deforming or the peripheral part suffering fatigue failure due to differential thermal expansion between the peripheral part and the central part. To avoid this, in this invention, the peripheral part is connected to the central part by way of an elastic member. As a result, because differential thermal expansion between the peripheral part and the central part can be absorbed by the elastic member, deformation of the central part and fatigue failure of the peripheral part due to differential thermal expansion between the two can be prevented.

Also, in this invention, preferably, a projecting central seal part surrounding the central part is provided on the elastic member. That is, when a projecting central seal part surrounding the central part is provided on the elastic member, in the assembling of the separator, it is not necessary to incorporate a central part gasket for surrounding the central part. Consequently, in the assembling of a fuel cell, it is possible to dispense with the trouble of incorporating a central part gasket.

In addition, in the assembling of the separator to a fuel cell, the central part can be surely sealed by the projecting central seal part. As a result, gases guided to the central part can be surely guided to the proper position, and reaction product produced in the central part can be surely guided to the proper position.

Also, in this invention, preferably, projecting passage seal parts severally surrounding the gas passages and the reaction product passages are provided on the peripheral part. When projecting passage seal parts severally surrounding the gas passages and the reaction product passages are provided on the peripheral part like this, in the assembling of the separator, it is not necessary to incorporate passage gaskets for surrounding the gas passages and the reaction product passages. As a result, in the assembling of a fuel cell, it is possible to eliminate the trouble of incorporating passage gaskets. Furthermore, in the assembling of the separator, the gas passages and reaction product passages can be surely sealed with the projecting passage seal parts.

Also, in the invention, preferably, the elastic member and the central seal part are formed integrally from a rubber material. When the elastic member and the central seal part are formed integrally from a rubber material like this, these members can be formed simultaneously. Consequently, the elastic member and the central seal part can be formed easily in a short time.

BEST MODES FOR CARRYING OUT THE INVENTION

Figure 1:
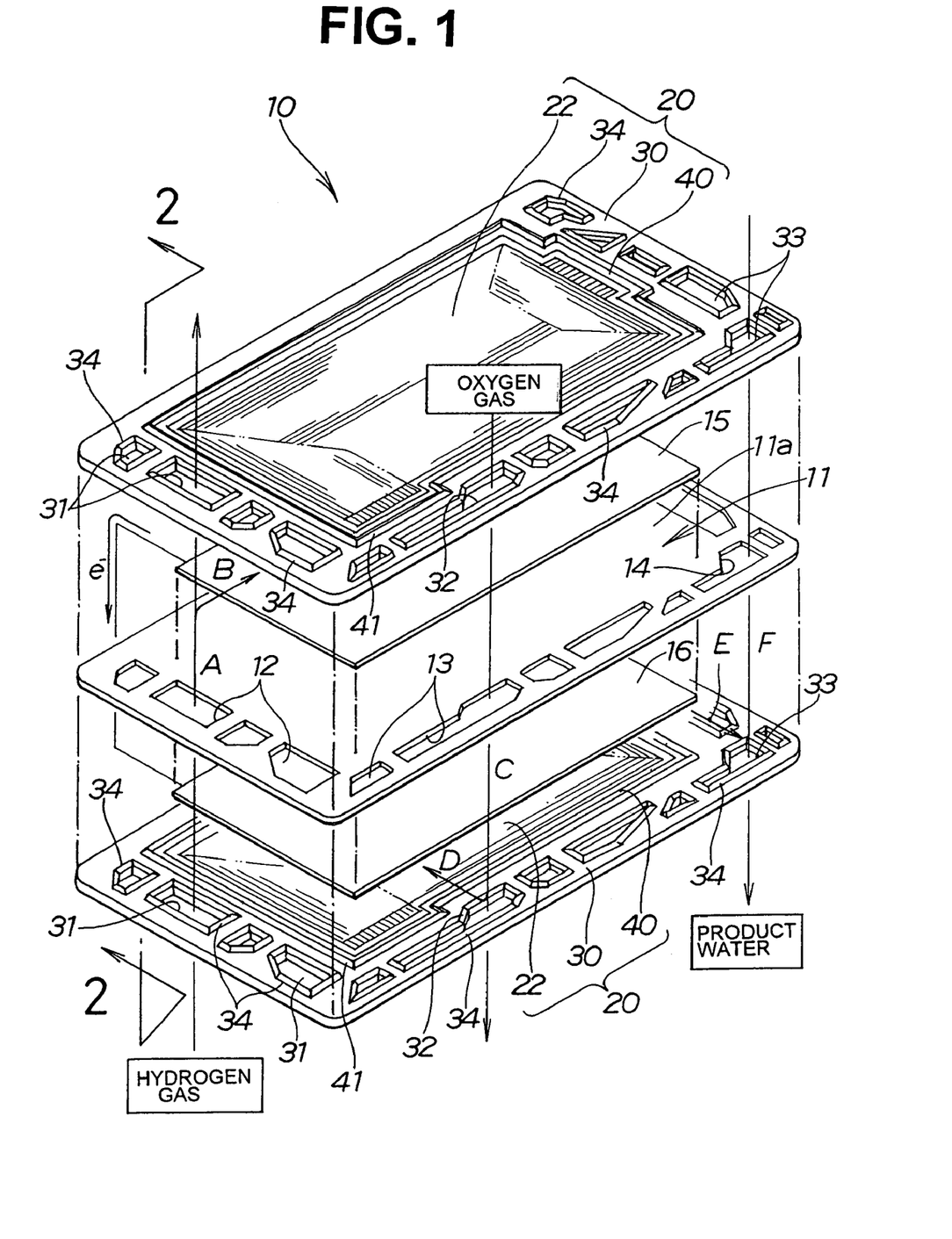
FIG. 1 is an exploded perspective view of a fuel cell having a fuel cell separator according to the invention.

A fuel cell 10 according to the invention shown in FIG. 1 has a structure wherein a negative electrode 15 and a positive electrode 16 are respectively disposed on the upper face 11a side and the lower face 11b (see FIG. 2) side of an electrolyte membrane 11 and an upper side separator 20 (fuel cell separator) is superposed on the negative electrode 15 and a lower side separator 20 is superposed on the positive electrode 16.

Here, generally the fuel cell 10 made by stacking the electrolyte membrane 11, the negative electrode 15, the positive electrode 16 and the upper and lower separators 20, 20 is referred to as a cell, and multiple cells arrayed in a stack are referred to as a fuel cell; however, in this specification, to facilitate understanding, the cell will be called a fuel cell.

In a peripheral part thereof, the electrolyte membrane 11 has multiple hydrogen gas passages (gas passages) 12 for guiding hydrogen gas (a reaction gas), multiple oxygen gas passages (gas passages) 13 for guiding oxygen gas (a reaction gas), and multiple product water passages (reaction product passages) 14 for guiding product water (a reaction product).

The negative electrode 15 and the positive electrode 16 are each formed somewhat smaller than the electrolyte membrane 11. The peripheries of the negative electrode 15 and the positive electrode 16 are positioned inward of the hydrogen gas passages 12, the oxygen gas passages 13 and the product water passages 14.

The separators 20 each have a metal central part 22, a resin peripheral part 30 around that, and an elastic member 40 connecting the central part 22 and the peripheral part 30 together.

The peripheral part 30 has multiple hydrogen gas passages (gas passages) 31 for guiding hydrogen gas, multiple oxygen gas passages (gas passages) 32 for guiding oxygen gas, and multiple product water passages (reaction product passages) 33 for guiding product water.

By the peripheral part 30 of each of the separators 20 being made a resin member and this peripheral part 30 being provided with hydrogen gas passages 31, oxygen gas passages 32 and product water passages 33, corrosion resistance of the hydrogen gas passages 31, the oxygen gas passages 32 and the product water passages 33 with respect to the gases and product water is ensured.

The multiple hydrogen gas passages 31 and oxygen gas passages 32 formed in the peripheral part 30 of each separator 20 are formed in locations such that they are aligned with the multiple hydrogen gas passages 12 and oxygen gas passages 13 formed in the peripheral parts of the electrolyte membrane 11 when the fuel cell 10 is assembled.

Also, the multiple product water passages 33 formed in each separator 20 are formed in locations such that they are aligned with the multiple product water passages 14 formed in the electrolyte membrane 11 when the fuel cell 10 is assembled.

With this fuel cell 10, hydrogen gas is supplied through the hydrogen gas passages 31, 12 as shown by the arrow A and guided to between the negative electrode 15 and the central part of the upper side separator 20 as shown by the arrow B. Oxygen gas is supplied through the oxygen gas passages 32, 13 as shown by the arrow C and guided to between the positive electrode 16 and the central part 22 of the lower side separator 20 as shown by the arrow D.

As a result of hydrogen gas being guided to the central part 22, hydrogen molecules ($H_2$) are brought into contact with a catalyst included in the negative electrode 15, and as a result of oxygen gas being guided to the central part 22, oxygen molecules ($O_2$) are brought into contact with a catalyst included in the positive electrode 16, and electrons $e^-$ flow as shown with an arrow and a current is produced.

At this time, product water ($H_2O$) is produced from the hydrogen molecules ($H_2$) and the oxygen molecules ($O_2$). This product water is guided to the product water passages 14, 33 as shown by the arrow E from the central part 22, and flows as shown by the arrow F.

Figure 2:
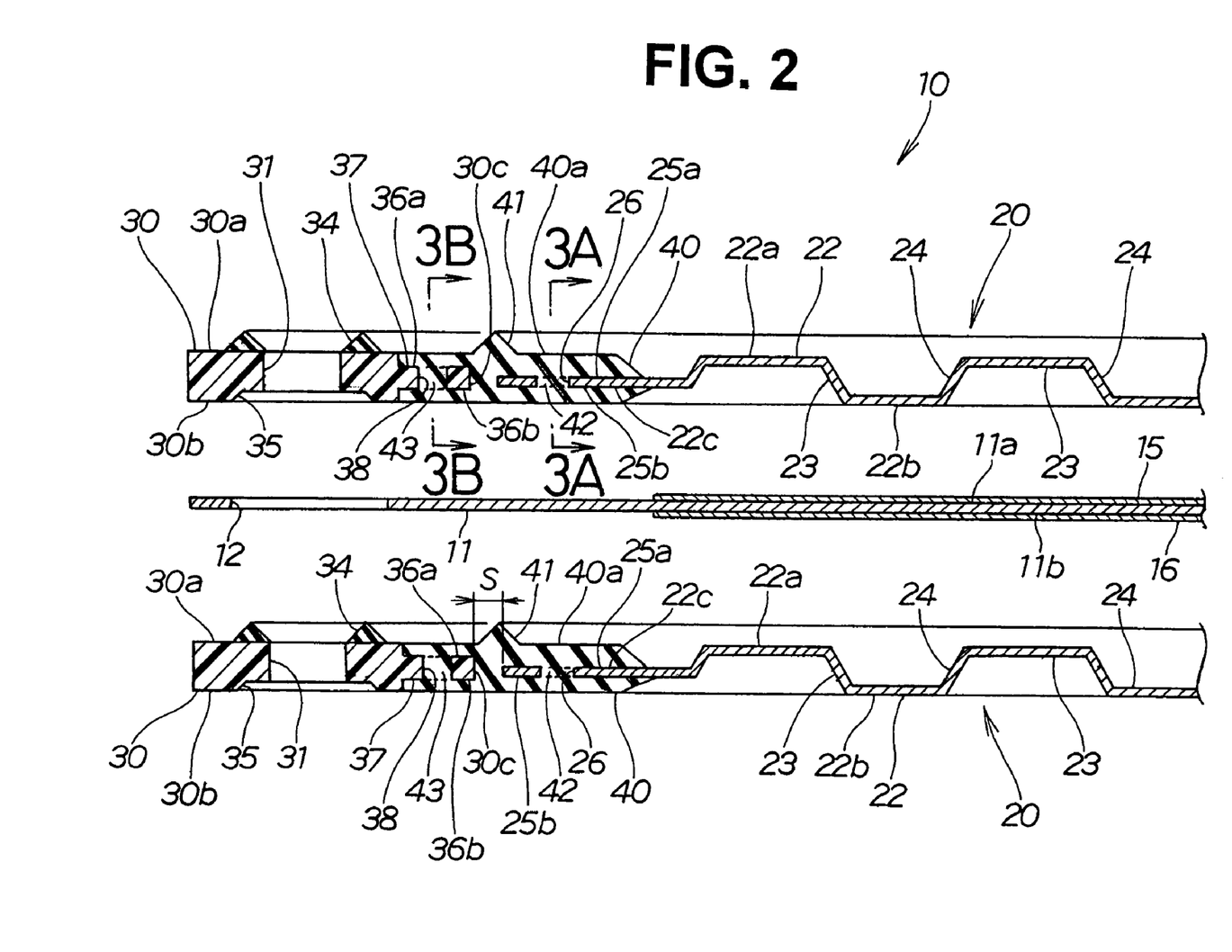
FIG. 2 is a sectional view on the line 2-2 in FIG. 1.

FIG. 2 shows the fuel cell separators 20 each made up of a metal central part 22, a resin peripheral part 30 and an elastic member 40.

The central part 22 is a metal member and is a stainless steel plate having multiple flow passages 23 for guiding hydrogen gas and multiple flow passages 24 for guiding oxygen gas formed in its upper face 22a and its lower face 22b, and passages for guiding product water (not shown), and having had an anti-corrosion plating treatment carried out on its upper face 22a and lower face 22b.

This central part 22 has primer-treated parts 25a, 25b, on which a primer treatment has been carried out, on its upper and lower faces around its edge part 22c, and has multiple first openings 26 provided at a predetermined spacing in the primer-treated parts 25a, 25b.

The shape of the first openings 26 may be round holes, slots or rectangular, and there is no restriction on this. The reasons for providing the primer-treated parts 25a, 25b and the first openings 26 will be discussed later.

The peripheral part 30 is a frame formed somewhat larger than the central part 22, and is a frame made of an engineering plastic with the multiple hydrogen gas passages 31, oxygen gas passages 32 and product water passages 33 (the passages 32, 33 are shown in FIG. 1) formed in this frame.

On the upper face 30a of the peripheral part 30, multiple projecting passage seal parts 34 are provided along the respective edges of the hydrogen gas passages 31, the oxygen gas passages 32 and the product water passages 33 so as to individually surround the hydrogen gas passages 31, oxygen gas passages 32 and product water passages 33.

Also, on the lower face 30b of the peripheral part 30, multiple passage recesses 35 are provided along the respective edges of the hydrogen gas passages 31, the oxygen gas passages 32 and the product water passages 33 so as to individually surround the hydrogen gas passages 31, oxygen gas passages 32 and product water passages 33.

In addition, in this peripheral part 30, by upper and lower recesses 36a, 36b being formed in the upper face 30a and the lower face 30b along the inner edge 30c, a part running along the inner edge 30c is made a thin part 37, and multiple second openings 38 are provided at a predetermined spacing in this thin part 37.

The shape of the second openings 38 may be round holes, slots or rectangular, and there is no restriction on this. The reason for providing the second openings 38 will be discussed later.

By the frame of the peripheral part 30 being formed somewhat larger than the central part 22, a gap S can be provided between the inner edge 30c of the peripheral part 30 and the edge 22c of the central part 22.

The projecting passage seal parts 34 are formed so that when the fuel cell 10 is assembled, they are pressed against the passage recesses 35 of the separator 20 disposed above on the other side of the passages 12, 13 and 14 (see FIG. 1 for passages 13, 14) of the electrolyte membrane 11.

Because at its peripheral part the projecting passage seal parts 34 are provided so as to surround the hydrogen gas passages 31, the oxygen gas passages 32 and the product water passages 33 individually, in the assembly of the separator 20 to the fuel cell 10 it is not necessary to incorporate a passage gasket for surrounding the hydrogen gas passages 31, oxygen gas passages 32 and product water passages 33. Consequently, in assembling the fuel cell 10, it is possible to dispense with the trouble of incorporating passage gaskets.

In addition, because the projecting passage seal parts 34 are provided so as to surround the hydrogen gas passages 31, the oxygen gas passages 32 and the product water passages 33 individually, in the assembling of the separator 20 to the fuel cell 10, the projecting passage seal parts 34 can be pressed against the passage recesses 35 to surely seal the hydrogen gas passages 31, oxygen gas passages 32 and product water passages 33.

The elastic member 40 is a connecting member made of silicone rubber which covers the primer-treated parts 25a, 25b of the central part 22 and the thin part 37 of the peripheral part 30, fills the first openings 26 and the second openings 38, and has on its upper face 40a a projecting central seal part 41 (see also FIG. 1) surrounding the central part 22.

Because the elastic member 40 is provided with a projecting central seal part 41 surrounding the central part 22, when the fuel cell 10 is assembled, it is not necessary to incorporate a central gasket for surrounding the central part 22. As a result, in the assembling of the fuel cell 20, it is possible to dispense with the trouble of incorporating a central gasket.

In addition, in the assembling of the separator 20, the projecting central seal part 41 can be pushed against the electrolyte membrane 11 to surely seal the central part 22. By this means, the hydrogen gas and oxygen gas guided to the central part 22 can be surely guided to the proper positions, and product water produced in the central part 22 can be surely guided to the proper position.

Also, because the elastic member 40 and the central seal part 41 are formed integrally from silicone rubber (rubber material), the elastic member 40 and the central seal part 41 can be formed simultaneously. Consequently, the elastic member 40 and the central seal part 41 can be formed easily in a short time.

Here, in the separator 20, when the upper and lower primer-treated parts 25a, 25b of the central part 22 are covered with the elastic member 40 and the thin part 37 of the peripheral part 30 is covered with the elastic member 40, by the first openings 26 and the second openings 38 each being filled with the elastic member 40, first anchors 42 can be provided in the first openings 26 and second anchors 43 can be provided in the second openings 38.

By this means, it is possible to prevent the central part 22 from detaching from the elastic member 40 and to prevent the peripheral part 30 from detaching from the elastic member 40 and thereby to firmly connect the peripheral part 30 to the central part 22.

Because the engineering plastic of the peripheral part 30 has a different thermal expansion coefficient from the stainless steel of the central part 22, if the peripheral part 30 were to be connected to the central part 22 directly, it is likely that the central part 22 would deform or the peripheral part 30 would suffer fatigue failure due to differential thermal expansion between the peripheral part 30 and the central part 22.

To avoid this, by the peripheral part 30 being connected to the central part 22 by way of the elastic member 40, differential thermal expansion between the peripheral part 30 and the central part 22 is absorbed. By this means, deformation of the central part 22 and fatigue failure of the peripheral part 30 due to differential thermal expansion between the peripheral part 30 and the central part 22 can be prevented.

The projecting central seal part 41 is formed so as to be pressed against the electrolyte membrane 11 when the fuel cell 10 is assembled.

Figure 3A:
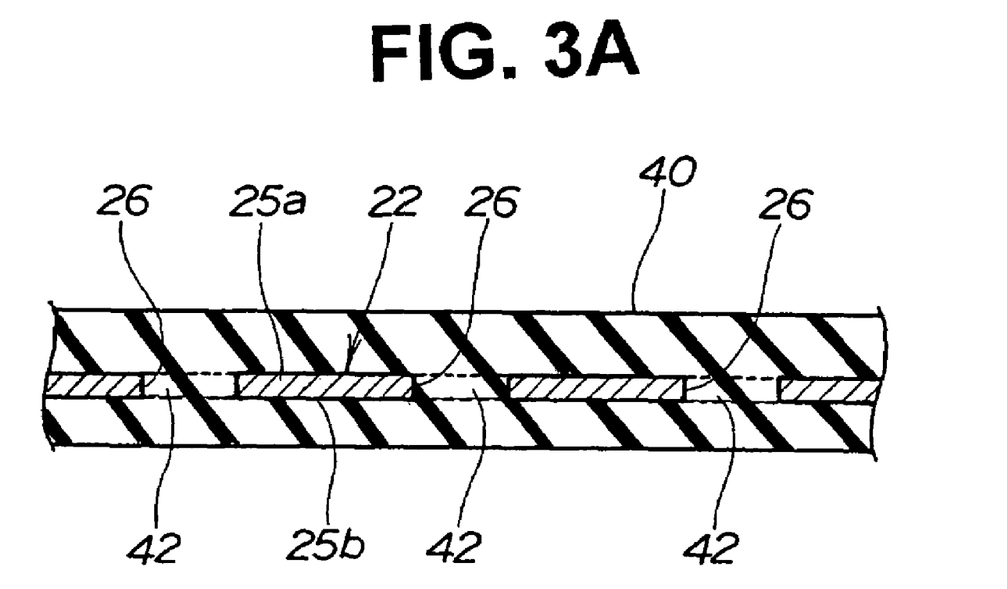
FIG. 3A is a sectional view on the line 3A-3A in FIG. 2.
Figure 3B:
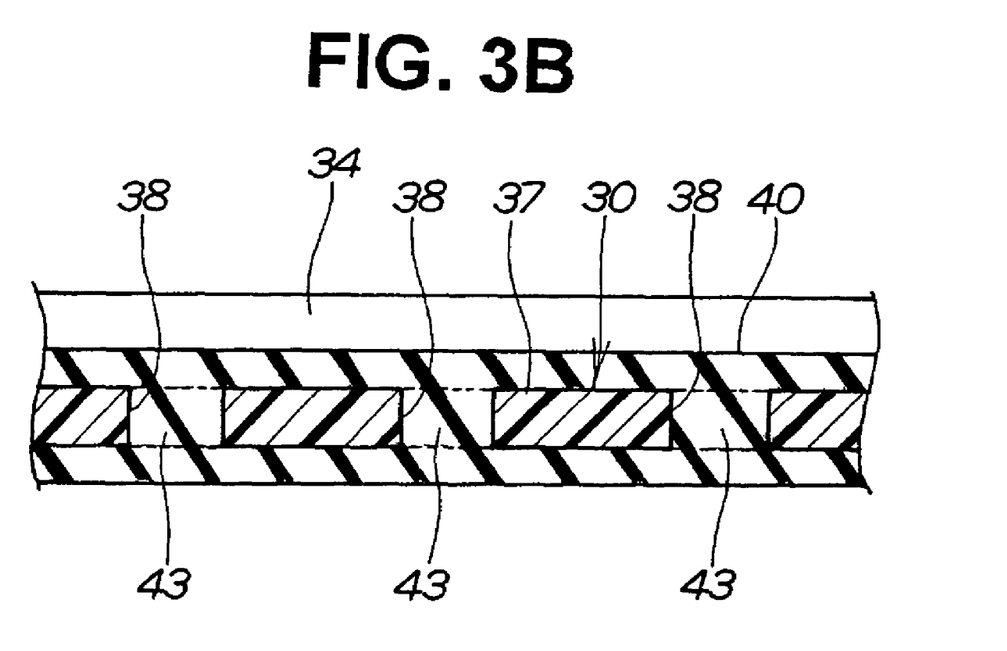
FIG. 3B is a sectional view on the line 3B-3B in FIG. 2.

FIG. 3A and FIG. 3B are a sectional view on the line 3A-3A and a sectional view on the line 3B-3B in FIG. 2.

FIG. 3A shows the first openings 26 formed as slots, as an example, and first anchors 42 provided in the first openings 26 by these slots being filled with the elastic member 40.

FIG. 3B shows the second openings 38 formed as slots, as an example, and second anchors 43 provided in the second openings 38 by these slots being filled with the elastic member 40.

Next, a process for manufacturing the fuel cell separator 10 will be described, on the basis of FIG. 4A through FIG. 9B.

Figure 4A:
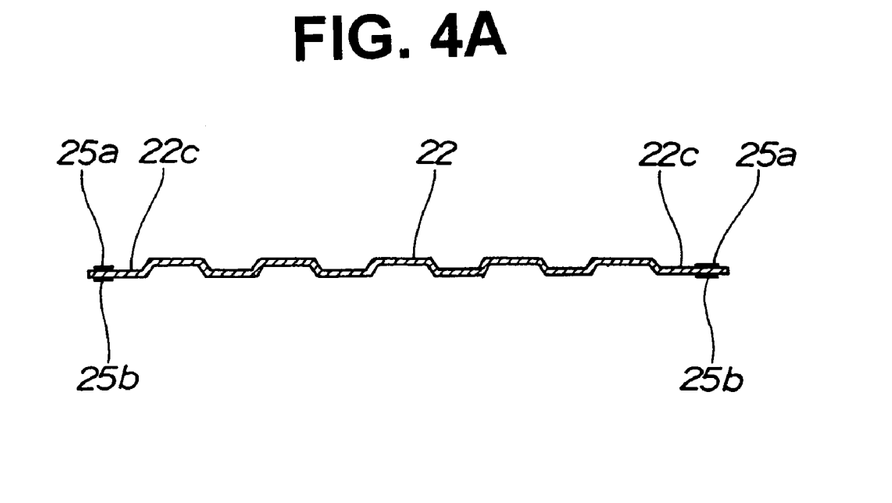
FIG. 4A and FIG. 4B are first action views illustrating steps in the manufacture of a fuel cell separator according to the invention, FIG. 4A showing a primer treatment having been carried out on the edge of a central part of a separator and FIG. 4B showing a primer-treated separator being placed on a fixed die mounted on a turntable.
Figure 4B:
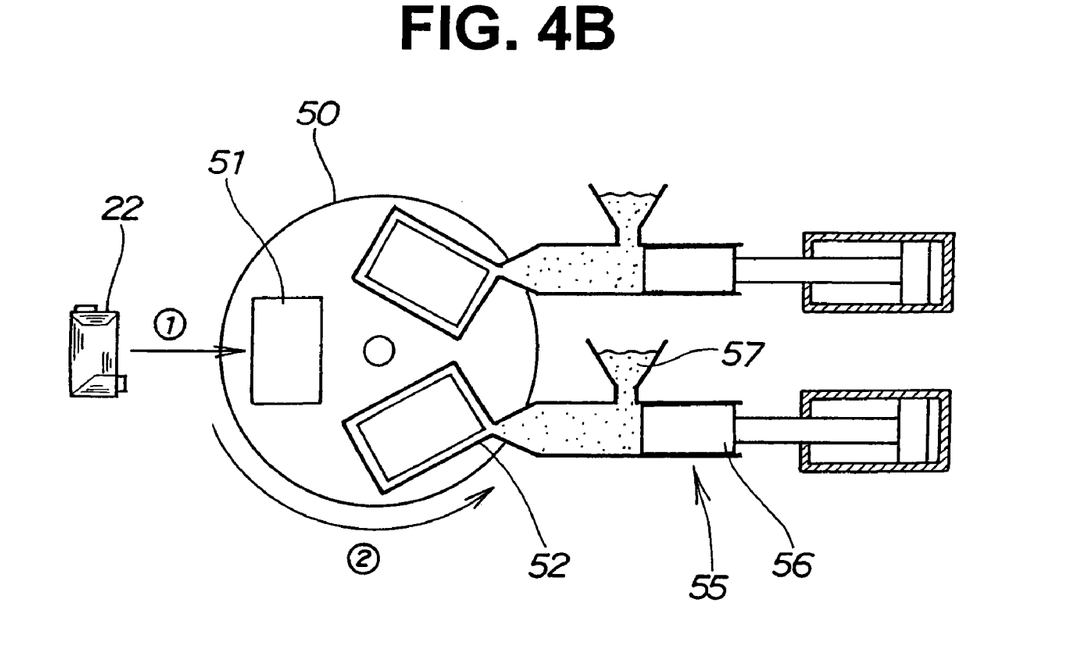

In FIG. 4A AND FIG. 4B are first action views illustrating steps in the manufacture of a fuel cell separator according to the invention.

In FIG. 4A, along the edge 22c of the central part 22, which is a metal member, a primer treatment is carried out on the upper and lower faces 22a, 22b. That is, silicone rubber is baked onto the upper and lower faces 22a, 22b at a temperature of 150° C. to form primer-treated parts 25a, 25b.

In FIG. 4B, the central part 22 with the primer-treated parts 25a, 25b is placed on a fixed die 51 on a turntable 50 as shown by the arrow [1]. Then, by the turntable 50 being turned as shown by the arrow [2], the fixed die 51 is brought to rest under a first movable die 52.

The fixed die 51 and the first movable die 52 form a peripheral part mold for injection-molding the peripheral part 30 of the separator 20 shown in FIG. 1 and FIG. 2.

Figure 5A:
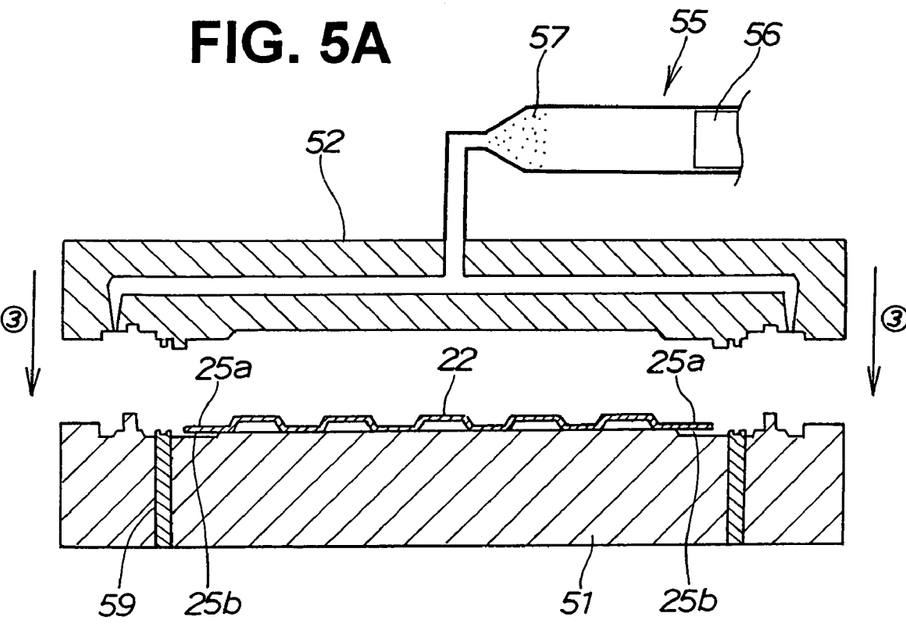
FIG. 5A and FIG. 5B are second action views illustrating steps in the manufacture of a fuel cell separator according to the invention, FIG. 5A showing a separator placed on a fixed die of a peripheral part mold and FIG. 5B showing a movable die lowered to close the peripheral part mold.
Figure 5B:
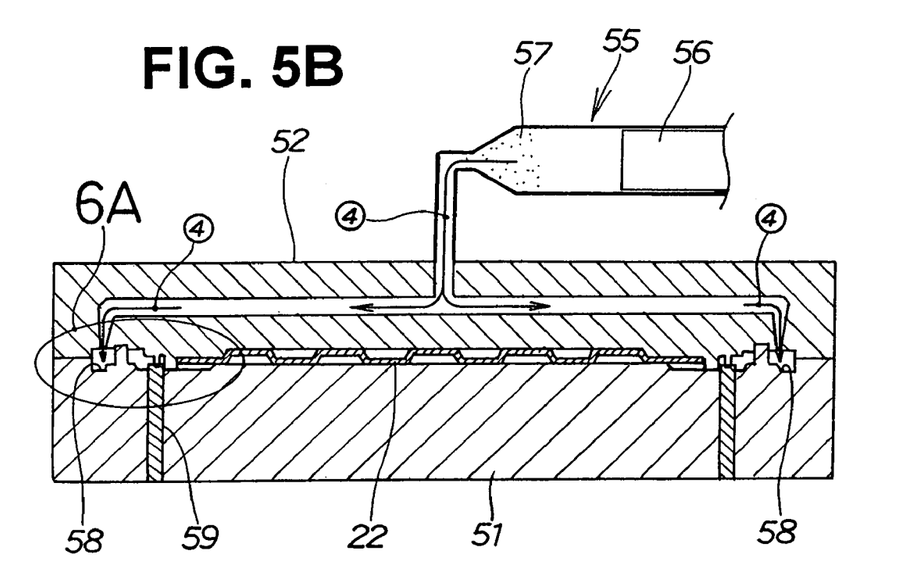

FIG. 5A and FIG. 5B are second action views showing a process for manufacturing a fuel cell separator according to the invention.

In FIG. 5A, by the first movable die 52 being lowered as shown by the arrows [3], the peripheral part mold is closed.

In FIG. 5B, by a plunger 56 of a peripheral part injecting device 55 shown in FIG. 4B being operated, a molten resin 57 of an engineering plastic is injected into a peripheral part cavity 58 as shown by the arrows [4].

Figure 6A:
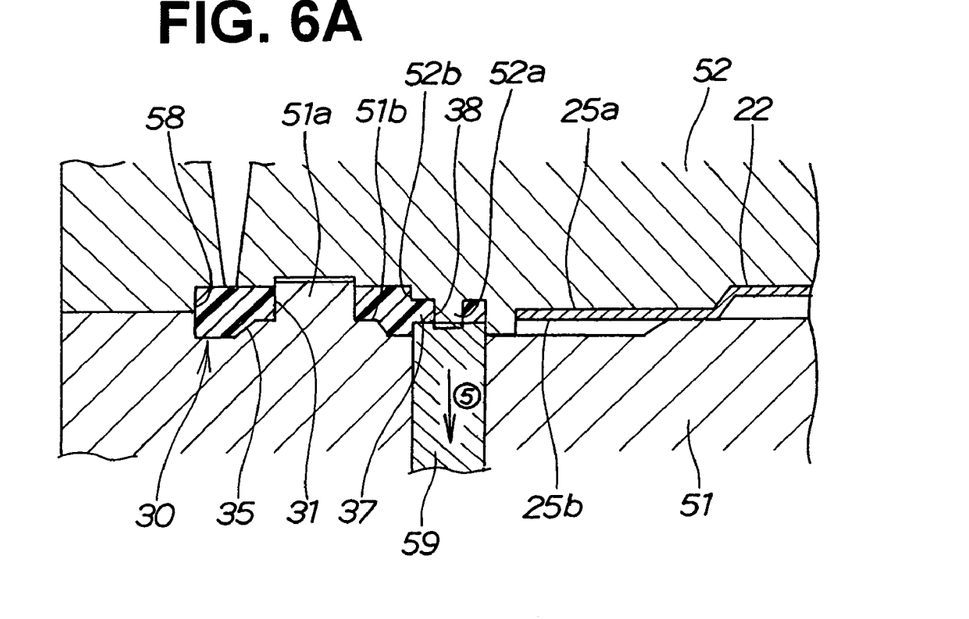
FIG. 6A and FIG. 6B are third action views illustrating steps in the manufacture of a fuel cell separator according to the invention, FIG. 6A being an enlarged sectional view of a part 6A in FIG. 5B and FIG. 6B being a sectional view showing a molded peripheral part of a separator.
Figure 6B:
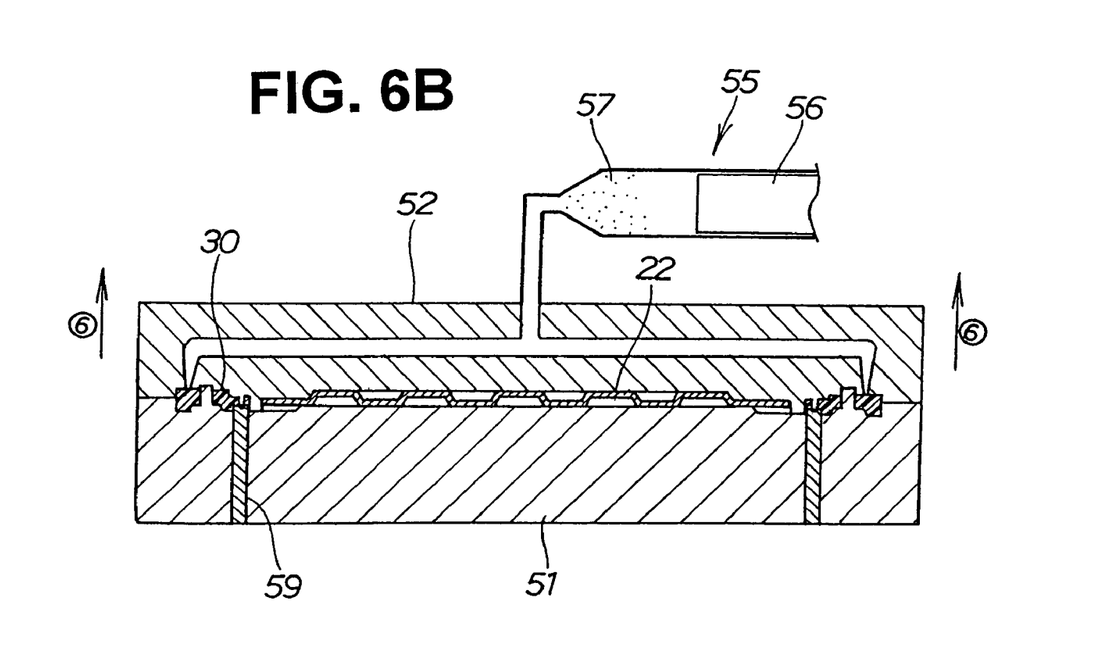

FIG. 6A and FIG. 6B are third action views showing a process for manufacturing a fuel cell separator according to the invention, FIG. 6A being an enlarged view of the part 6B in FIG. 5B.

In FIG. 6A, with multiple projections 51a of the fixed die 51 projecting toward the first movable die 52 inside the peripheral part cavity 58 and multiple shoulder parts 51b protruding inside the peripheral part cavity 58, the peripheral part cavity 58 is filled with the molten resin 57.

As a result, when the peripheral part 30 is molded, hydrogen gas passages 31, oxygen gas passages 32 and product water passages 33 (the flow passages 32, 33 are shown in FIG. 1) are formed, and passage recesses 35 are molded at the edges of these flow passages 31, 32, 33.

Also, a core 59 is made to project slightly into the peripheral part cavity 58 from the fixed die 51, projections 52a of the first movable die 52 are made to project as far as the core 59, and shoulder parts 52b are made to project slightly into the peripheral part cavity 58, whereby a thin part 37 is formed and second openings 38 are formed in the thin part 37.

Then, after the molten resin 57 has set inside the peripheral part cavity 58, the core 59 is withdrawn from inside the peripheral part cavity 58 as shown by the arrow [5].

In FIG. 6B, by the first movable die 52 being raised as shown by the arrows [6], the peripheral part mold is opened. This ends the step of injection-molding the peripheral part 30.

Figure 7A:
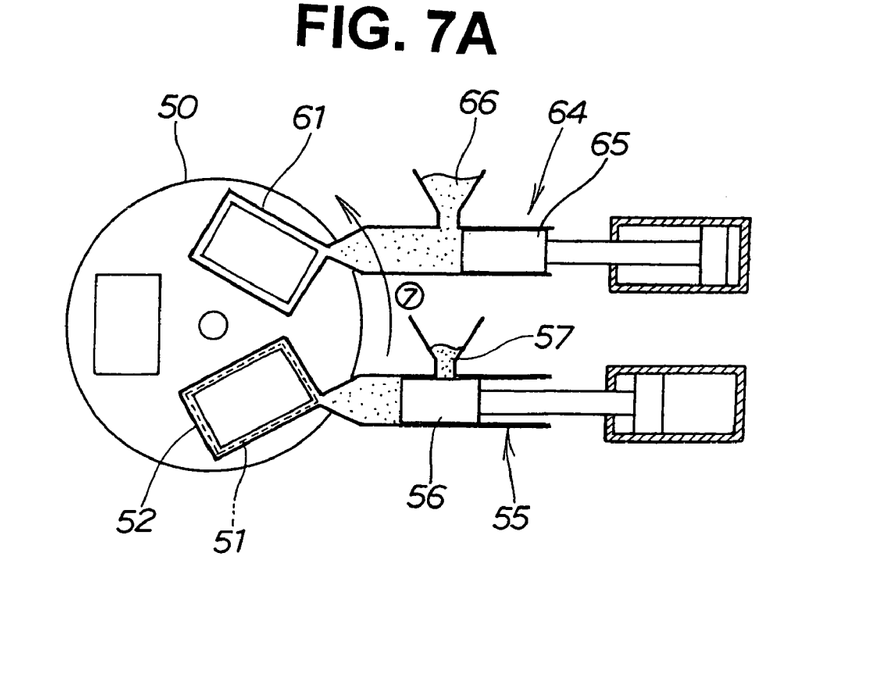
FIG. 7A and FIG. 7B are fourth action views illustrating steps in the manufacture of a fuel cell separator according to the invention, FIG. 7A being a view showing a turntable and an elastic member injection-molding apparatus for molding an elastic member of a separator and FIG. 7B being a sectional view of an elastic member mold as a second moving die is lowered onto a fixed die with a separator placed upon it.
Figure 7B:
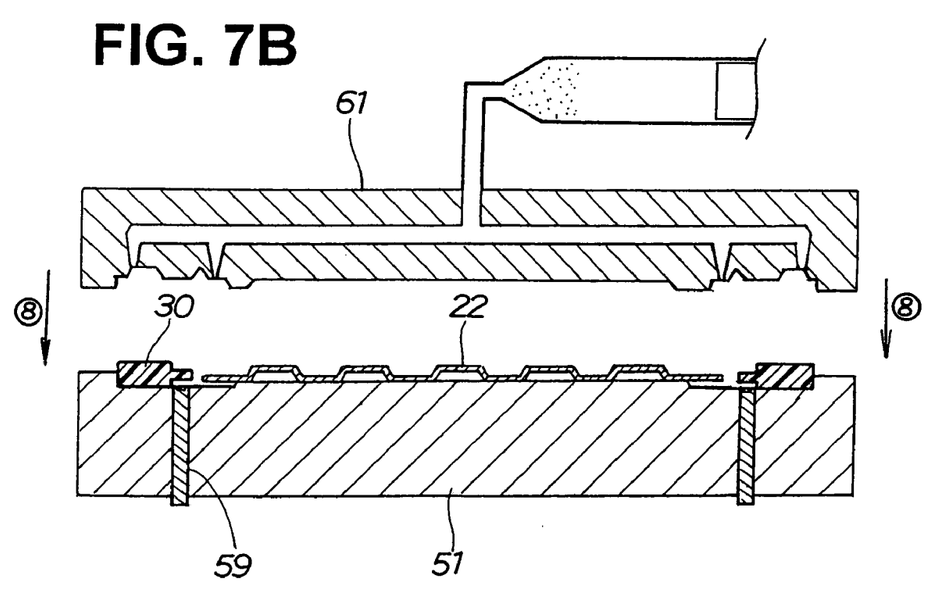

FIG. 7A and FIG. 7B are fourth action views showing a process for manufacturing a fuel cell separator according to the invention.

In FIG. 7A, by the turntable 50 being turned as shown by the arrow [7], the fixed die 51 is brought to rest under a second movable die 61.

The fixed die 51 and the second movable die 61 form an elastic member mold for injection-molding the elastic member 40 of the separator 20 shown in FIG. 1 and FIG. 2.

In FIG. 7B, by the second movable die 61 being lowered as shown by the arrows [8], the elastic member mold is closed.

Figure 8A:
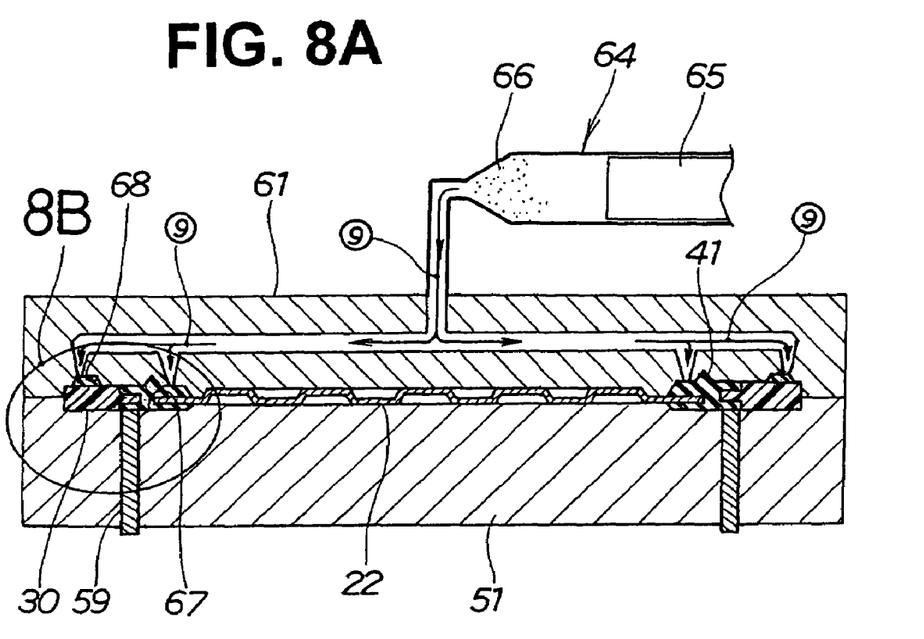
FIG. 8A and FIG. 8B are fifth action views illustrating steps in the manufacture of a fuel cell separator according to the invention, FIG. 8A being a sectional view of the elastic member mold closed and FIG. 8B being an enlarged sectional view of a part 8B in FIG. 8A.
Figure 8B:
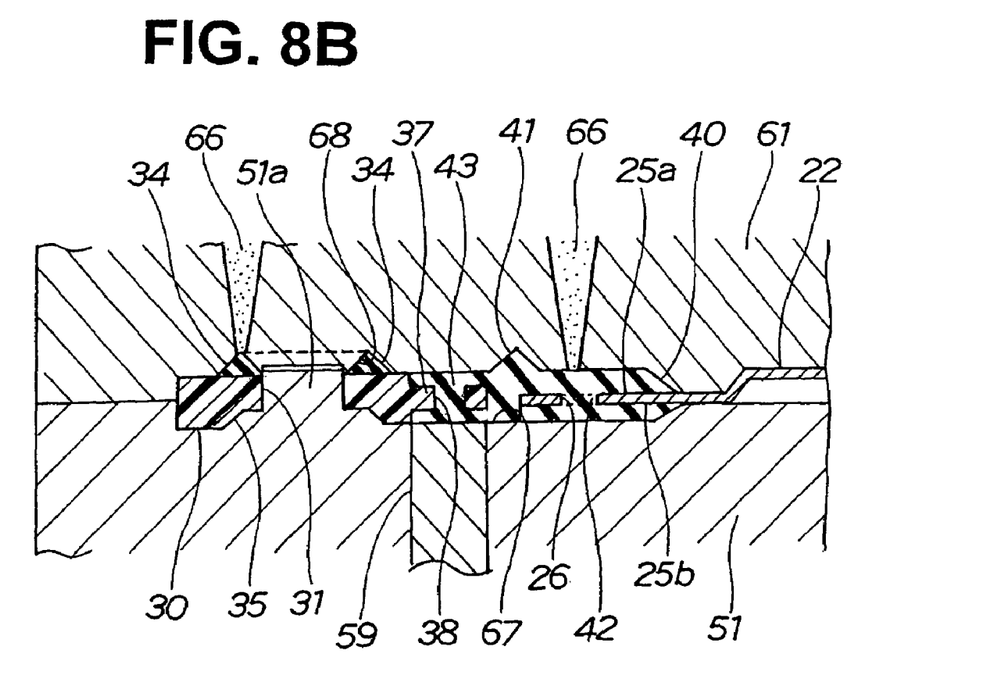

FIG. 8A and FIG. 8B are fifth action views showing a process for manufacturing a fuel cell separator according to the invention.

In FIG. 8A, by the elastic member mold being closed, an elastic member cavity 67 is formed by the fixed die 51 and the second movable die 61, and seal cavities 68 are formed by the second movable die 61 and the peripheral part 30.

In this state, by a plunger 65 of an elastic member injecting device 64 shown in FIG. 7A being operated, a molten resin 66 of silicone rubber is filled into the elastic member cavity 67 and the seal cavities 68 as shown by the arrows [9].

In FIG. 8B, by the elastic member cavity 67 being filled with the molten resin 66, the upper and lower primer-treated parts 25a, 25b of the central part 22 are covered with an elastic member 40, the thin part 37 of the peripheral part 30 is covered with the elastic member 40, and a central seal part 41 is molded.

Here, although the central part 22 is a metal member, because the primer-treated parts 25a, 25b have been provided at the periphery of the central part 22, the elastic member 40 can be adhered well to the central part 22.

In addition, by the first openings 26 and the second openings 38 being filled with the elastic member 40, first anchors 42 and second anchors 43 can be formed in the first openings 26 and the second openings 38 respectively.

By this means, the central part 22 can be prevented from detaching from the elastic member 40, and the peripheral part 30 can be prevented from detaching from the elastic member 40.

And, at the same time as the elastic member cavity 67 is filled with the molten resin 66, by the seal cavities 68 formed by the second movable die 61 and the peripheral part 30 being filled with the molten resin 66, passage seal parts 34 are formed.

By this means, in the molding of the elastic member 40, the passage seal parts 34 and the central seal part 41 can be molded from silicone rubber (rubber material) simultaneously. Thus, the elastic member 40, the passage seal parts 34 and the central seal part 41 can be formed easily in a short time.

Figure 9A:
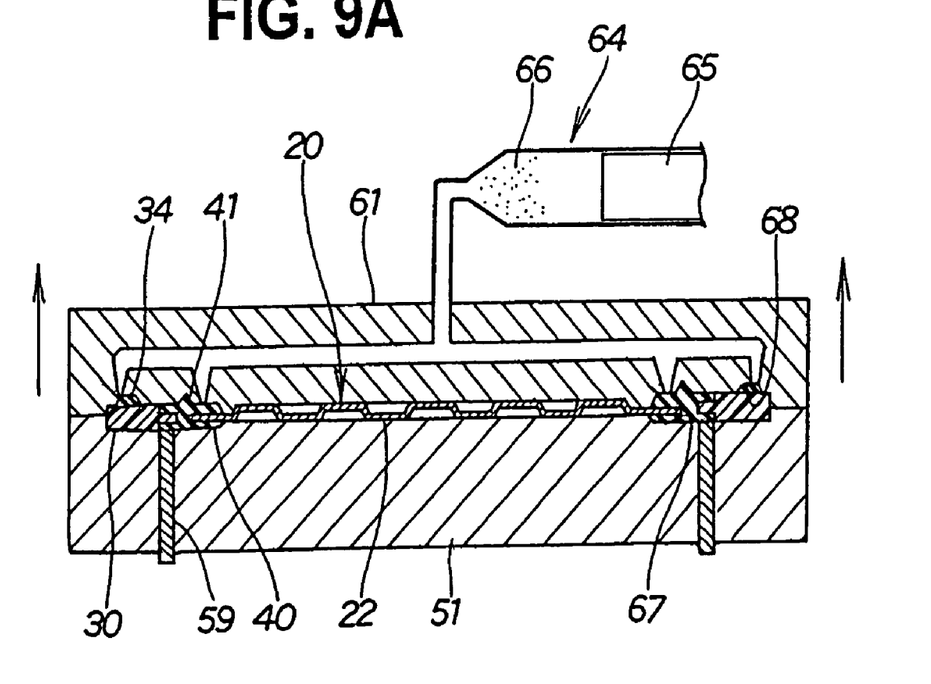
FIG. 9A and FIG. 9B are sixth action views illustrating steps in the manufacture of a fuel cell separator according to the invention, FIG. 9A being a sectional view showing an elastic member having been molded and the mold about to open and FIG. 9B being a view showing the manufacture of a separator according to the invention having been completed and the separator being removed from the fixed die.
Figure 9B:
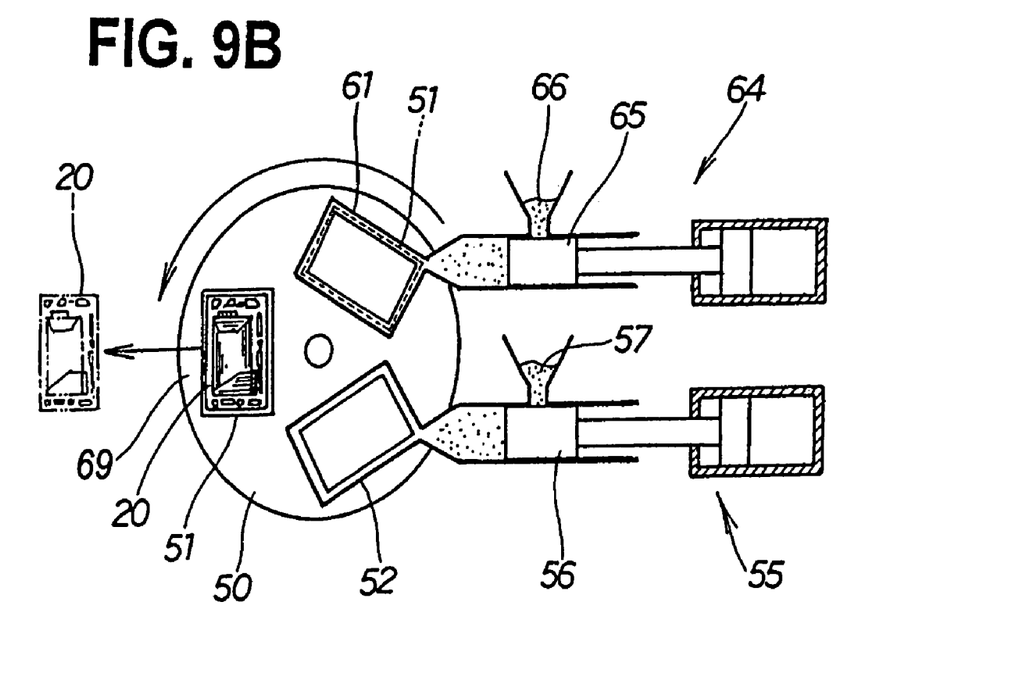

FIG. 9A and FIG. 9B are sixth action views showing a process for manufacturing a fuel cell separator according to the invention.

In FIG. 9A, after the molten resin 66 in the elastic member cavity 67 and the molten resin 66 in the seal cavities 68 has been allowed to set, the elastic member mold is opened by the second movable die 61 being raised as shown with arrows.

By this means, the step of injection-molding the elastic member 40 and the passage seal parts 34 is completed, and a fuel cell separator 20 can be obtained.

In FIG. 9B, after the elastic member mold is opened, by the turntable 50 being turned as shown with an arrow, the fixed die 51 is brought to rest at a loading/unloading area 69. Next, the fuel cell separator 20 is removed from the fixed die 51 as shown with an arrow. By this means, the process of manufacturing a fuel cell separator 20 is completed.

As explained with reference to FIG. 4A through FIG. 9B, as a result of being so constructed that a peripheral part 30 of the separator 20 is connected to a central part 22 by an elastic member 40, the separator 20 can be manufactured relatively easily. Therefore, the yield in the manufacture of separators 20 can be raised, and the productivity of separators 20 can be increased.

Although silicone rubber is exemplified as the elastic member 40 and the passage seal parts 34 in the above embodiment, the elastic member 40 and the passage seal parts 34 are not limited to it and another rubber and resins may be used therefore.

Although in the embodiment described above an example was described wherein stainless steel was used for the metal member forming the central part 22 of the fuel cell separator 20, the metal member forming the central part 22 is not restricted to this.

Also, although in the embodiment described above an example was described wherein an engineering plastic was used for the resin member forming the peripheral part 30 of the fuel cell separator 20, the resin member forming the peripheral part 30 is not restricted to this.

And although in the embodiment described above an example was described wherein a projecting central seal part 41 surrounding the central part 22 of the separator 20 was provided on the elastic member 40, there is no restriction to this, and alternatively the projecting central seal part 41 surrounding the central part 22 may be not provided on the elastic member 40.

Also, although in the embodiment described above an example was described wherein projecting passage seal parts 34 surrounding the gas passages 31 and 32 and the product water passages 33 were provided on the peripheral part 30 of the separator 20, the passage seal parts 34 may alternatively be not provided.

And whereas in the embodiment described above an example was described wherein the elastic member 40, the central seal part 41 and the passage seal parts 34 were formed integrally from a rubber material, there is no restriction to this, and the elastic member 40, the central seal part 41 and the passage seal parts 34 can also each be formed individually, and the respective members 40, 41, 34 can also be each formed from a different material.

Also, whereas in the embodiment described above hydrogen gas and oxygen gas were used as examples of reaction gases and product water was used as an example of a reaction product, there is no restriction to this, and the invention can also be applied to other reaction gases and reaction products.

INDUSTRIAL APPLICABILITY

By making the whole of the peripheral part of a separator a resin member and forming gas passages and product water passages in this peripheral part, it is possible to ensure resistance of the gas passages and product water passages to corrosion by reaction gases and product water. Because of this the fuel cell has excellent corrosion resistance and is particularly useful as a fuel cell for use in an automotive vehicle.

The invention claimed is:

1. A fuel cell separator comprising:
   a metal central part;
   a resin frame part surrounding the metal central part, wherein the resin frame part is larger than the metal central part such that the resin frame part and the central metal part are separated by a gap;
   a connecting part disposed between the metal central part and the resin frame part to thereby connect the metal central part and the resin frame part, wherein the connecting part is an elastic member;
   a plurality of reaction gas passages defined in the frame part, wherein the plurality of reaction gas passages guide reaction gases to the metal central part; and
   a plurality of reaction product passages defined in the frame part, wherein a reaction product produced at the metal central part is guided to the plurality of reaction product passages.

2. The fuel cell separator according to claim 1, wherein a projecting central seal part surrounding the central part is provided by the elastic member.

3. The fuel cell separator according to claim 1, wherein the frame part includes projecting passage seal parts that surround the reaction gas passages and the reaction product passage.

4. The fuel cell separator according to claim 2, wherein the elastic member and the central seal part are formed integrally from a rubber material.

5. The fuel cell separator according to claim 2, wherein the frame part includes projecting passage seal parts that surround the reaction gas passages and the reaction product passage.

* * * * *